United States Patent Office  3,460,874
Patented Aug. 12, 1969

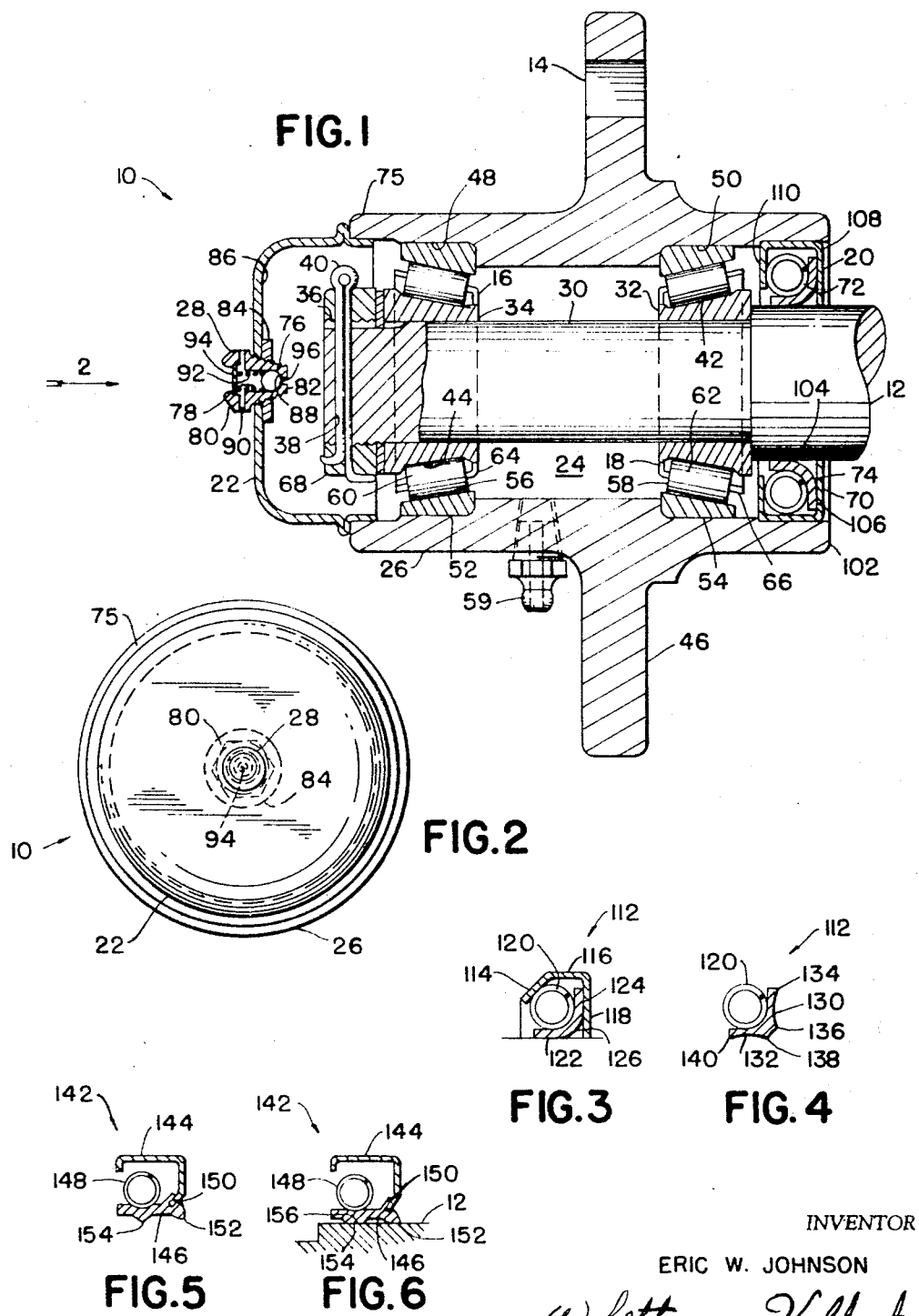

3,460,874
SEALED BEARING
Eric W. Johnson, 2431 Pointe Tremble Road,
Algonac, Mich. 48001
Continuation-in-part of application Ser. No. 391,382,
Aug. 24, 1964. This application Mar. 17, 1967, Ser.
No. 624,083
Int. Cl. F16c 1/24, 33/78, 35/08
U.S. Cl. 308—187.2                           1 Claim

ABSTRACT OF THE DISCLOSURE

Sealed bearing structure including a hub, bearings mounting the hub for rotation on the end of an axle, means securing the bearings and hub to the axle, a grease fitting located centrally of the hub for introducing grease into the hub, a grease seal at one end of the hub for preventing leakage of grease between the hub and axle and for preventing water from entering the sealed bearing structure between the hub and axle on immersion of the hub and axle in water and a cover sealing the other end of the hub and extending over the end of the axle having a check valve located on the axis of rotation of the hub for permitting exit of air under pressure from the sealed bearing structure while preventing entry of water into the sealed bearing structure on immersion of the hub and axle in water.

CROSS REFERENCE TO RELATED APPLICATION

The present application is a continuation-in-part of copending application, Ser. No. 391,382, filed Aug. 24, 1964, now abandoned.

BACKGROUND OF THE INVENTION

Field of the invention

The invention relates to sealed bearing structure and refers more specifically to improved structure for sealing a wheel bearing for use on boat trailers and the like to prevent entry of water into the bearing structure and improved means for bleeding air from the sealed bearing structure to relieve pressure therein due to temperature rise in the bearing structure on operation thereof without loss of bearing packing grease.

In the past wheel bearing structures for boat trailers and the like which may be completely immersed in water as in placing a boat in or taking a boat from water have been deficient in allowing water to collect in the wheel bearings. Water in the wheel bearings promotes early deterioration of the bearings.

Wherein sealed wheel bearings have been used in the past they have been of relatively complicated construction and therefore difficult and expensive to manufacture or have been inefficient in keeping the water on the outside of the bearing structure and in retaining bearing grease within the bearing structure during high speed operation.

Thus, in the past where sealed bearings have been packed in grease under pressure without adequate pressure relief structure, excessive pressures have been built up in the sealed bearings during operation as the result of heat produced by friction in the bearings causing expansion of the packing grease and consequent compression of air trapped in the bearing chamber. Such excessive pressures are undesirable in that they contribute to early failure of the bearing structure.

Where pressure relief valves have been provided for sealed bearing structure of the past, the valves have been located eccentrically of the rotatable member of the bearing structure so that on expansion of the packing grease in the bearing chamber, considerable grease has been lost through the pressure relief valve.

Description of the prior art

The principal known prior art is the United States Stephens Patent No. 3,064,982 and the other patents cited in applicant's previously referenced copending patent application illustrating check valves in use with bearing structures. These references do not provide a simple, economical and efficient sealed bearing capable of preventing entry of water into a boat trailer wheel bearing and permitting escape of high pressures built up within the hub during rotation thereof without the loss of packing grease. In particular the prior art does not teach bearing seals and check valves used in conjunction with a wheel bearing and in accordance with the invention to provide sealed wheel bearing structure.

SUMMARY OF THE INVENTION

The invention is the provision of sealed wheel bearing structure for boat trailers and the like including improved means for sealing between a wheel hub and axle and for permitting the escape of high pressure from the interior of the bearing structure without substantial loss of packing grease and without permitting entry of water into the sealed bearing structure. An improved sealing structure and grease cap having a centrally located check valve are provided for use in conjunction with wheel bearing structure to effect the improved sealed bearing structure.

BRIEF DESCRIPTION OF THE DRAWING

FIGURE 1 is a longitudinal section view of sealed bearing structure constructed in accordance with the invention.

FIGURE 2 is an elevation of the sealed bearing structure illustrated in FIGURE 1 taken in the direction of arrow 2 in FIGURE 1.

FIGURE 3 is a cross section of modified grease seal structure for use in the sealed bearing illustrated in FIGURE 1.

FIGURE 4 is a cross section similar to FIGURE 3 of a further modification of the grease seal structure.

FIGURES 5 and 6 are cross sections similar to FIGURES 3 and 4 of another modification of the grease seal structure illustrated in FIGURE 1.

DESCRIPTION OF THE PREFERRED EMBODIMENTS

As shown best in FIGURE 1 the sealed bearing structure 10 includes the fixed axle 12, the wheel hub 14, bearings 16 and 18 positioned between the axle 12 and hub 14 and the annular grease seal 20 and grease cup 22 forming a bearing chamber 24 with the cylindrical portion 26 of hub 14. The sealed bearing structure 10 is completed by the pressure relief valve 28 positioned in the grease cup 22 on the axis of rotation of the hub 14 on axle 12.

More specifically the axle 12 which may be the axle of a boat trailer is provided with a radially reduced end portion 30 on which the inner bearing races 32 and 34 are positioned. Axle 12 is further provided with threads 36 on the outer end thereof and a radially extending opening 38 therethrough to receive cotter pin 40. As shown in FIGURE 1, the inner bearing races 32 and 34 have annular bearing surfaces 42 and 44 thereon tapering radially inwardly of the axle 12 toward each other.

The hub 14 besides the cylindrical portion 26 includes the radially extending flange portion 46 to which a tire rim for a boat trailer for example, may be secured by convenient means (not shown). The portion 26 of hub 14 is provided with interior, radially enlarged end portions 48 and 50, best shown in FIGURE 1, in which the outer bearing races 52 and 54 are positioned.

The bearing races 52 and 54 are provided with the bearing surfaces 56 and 58 which, as shown in FIGURE 1, also taper radially inwardly of the axle 12 toward each other. In assembly the bearings 16 and 18 further include the rollers 60 and 62 and cages 64 and 66 respectively, which are positioned between the bearing races 34 and 52 and bearing races 32 and 54, as shown in FIGURE 1.

The axle 12, bearings 16 and 18 and wheel hub 14 are held in assembly by the nut 68 threaded on the end of axle 12 and secured thereon by cotter pin 40.

The bearing chamber 24 is sealed at the right, as shown in FIGURE 1, by the grease seal 20 including the cage 70, annular resilient member 72 and the annular sealing member 74. As shown in FIGURE 1 the cage 70 is an annular metal member having a generally U-shaped cross section opening inwardly. The cage 70 is received in the radially enlarged interior of the end 102 of the cylindrical portion 26 of the hub 14 as by a fit sufficient to prevent axial movement of the grease seal 20 with respect to the hub 14 and to seal between the hub 14 and cage 70. The sealing member 74 is constructed of rubber or the like, is annular and has a portion 104 extending axially of the axle 12 and a radially extending portion 106 extending transversely of the axle 12, as shown. The resilient member 72, which may be an annular coil spring, is operable to secure the sealing member 70 in sealing engagement with the axle 12 and with the radially extending wall 108 of the cage 70.

Thus, it will be seen that in FIGURE 1, the cage is of a dimension between the inwardly extending legs of the U-shaped cross section thereof, such as to cause the resilient member 72 when inserted in the annular recess provided by the cage to press against both the radially extending wall 110 of the cage and the radially extending portion 106 of the sealing member 74. In addition, the resiliance of the resilient member which may be an annular coil spring for example, produces tight contact of the portion 104 of the sealing member 74 with the surface of the axle 12 immediately adjacent the reduced diameter end portion thereof which surface is machined to a micro-finish. Further, it will be noted that the radially extending portion 110 of the cage 70 is such as to extend over at least half the diameter of the resilient member 72 with the grease seal 20 installed on the axle 12 to insure proper positioning of the resilient member 72 against portion 106 of the sealing member 106 on insertion of the grease seal 20 over the axle 12.

The modified grease seal structure 112 illustrated in FIGURE 3 is the same as the seal structure 20 illustrated in FIGURE 1, except that the leg 114 of the cage 116 is at an angle to the leg 118. Thus with the seal structure 112, when the resilient member 120 is moved radially outwardly on insertion of the seal structure 112 over the axle 12, the resilient member 120 will engage the leg 114 to provide forces acting through the resilient member 120 on both the axially extending portion 122 and the radially extending portion 124 of the sealing member 126. A positive seal in both the radial and axial direction through the grease seal 112 is thus provided.

The further modification of the bearing seal structure 112 illustrated in FIGURE 4 includes the concave sealing surfaces 130 and 132 on the sealing member 126 providing the radial sealing areas 134 and 136 and the axial sealing areas 138 and 140 shown in FIGURE 4. The grease seal structure 112 shown in FIGURE 4 is illustrated without the cage 116 and out of contact with axle 12 to show the initial configuration of the sealing member 26. The concave configuration of the sealing surfaces of the sealing member 126 shown in FIGURE 4 provides more efficient sealing in contact with the cage of the grease seal and the axle 12.

The modified grease seal 142 illustrated in FIGURES 5 and 6 includes the cage 144, the sealing member 146 and the resilient member 148 shaped as shown in cross section in FIGURES 5 and 6. As shown in FIGURE 6 the cage 144 and sealing member 146 are bonded at the surface 150 so that they are an integral member with the cage being metal and the sealing member being rubber or the like. Also, it will be particularly noted that the configuration of the sealing member 146 provides exterior sealing area 152 and interior sealing area 154 whereby water and grease, respectively, are prevented from passing through the seal 142.

Further, it will be noted in FIGURE 5 that the sealing area 154 is radially inwardly of the annular grease seal 142 from the sealing area 152 and that the resilient member 148 is positioned directly, radially outwardly from the inner sealing area 154 to provide maximum sealing at the inner sealing area 154.

The grease seal 142 is thus particularly simple in construction, economical to manufacture and efficient in use, as shown in FIGURE 6, wherein the sealing member 146 is shown deformed and in sealing engagement with the micro-finish surface 156 of axle 12.

The pressure relief valve 28, as shown in FIGURE 1, is a check valve including the ball valve 76 positioned within the outwardly enlarged opening 78 in the valve body member 80. The tapered and threaded end 82 of the valve body member 80 is threaded through the nut 84 secured to the inner surface 86 of the grease cup 22 by conventional means, such as welding. The valve body member 80 is provided with the valve seat 88 and radially extending air escape passages 90. The spring 92 operating against the valve plate 94 secured within the outer end of the passage 78 urges the ball valve 76 into position on the valve seat 88 to close the valve orifice 96. It will be noted that the valve 28 is positioned on the axis of rotation of the sealed bearing structure 10.

Thus, in operation, with the sealed bearing structure 10 assembled, as shown in FIGURES 1 and 2, packing grease is forced into the bearing chamber 24 through grease fitting 59. At this time air may be trapped within the bearing chamber 24 and compressed under the pressure of the packing grease. A portion of the air may bleed out of the valve 28 during filling of the bearing chamber 24 with packing grease. Subsequently during rotation of the hub 14 about the axle 12 friction produced in the sealed bearing structure heats the packing grease so that the packing grease becomes relatively fluid and expands. At this time since the packing grease is heavier than the compressed air trapped in the bearing chamber 24, it will move radially outwardly of the axis of rotation of the hub 14. Thereafter as the grease expands and the pressure builds up in the chamber 24, the pressure relief check valve 28 will open and the air trapped in the chamber 24 which is now concentrated along the axis of rotation of the hub 14 will bleed out through the pressure relief valve 28. Substantially complete exhaustion of the trapped air from chamber 24 may thus be accomplished without the loss of any substantial amount of bearing packing grease.

In addition due to the particular check valve structure and grease seal structure placed at the opposite ends of the hub to seal the hub, water will be prevented from entering the hub. Thus the life of the hub is greatly extended since excess pressures are not allowed to build up in the hub and water is kept out of the hub even during immersion of the hub in water, such as in launching a boat from a trailer with which the hub is assembled.

What I claim as my invention is:
1. Sealed bearing structure comprising an axle having a reduced diameter end portion, an annular micro-finished surface adjacent the reduced diameter end portion of the axle, a threaded end on the reduced diameter end portion of the axle, first and second annular bearings having radially inner and outer races and a bearing cage and bearings positioned between the inner and outer races permitting relative rotation between the inner and outer races sleeved over the reduced diameter end of the axle, a wheel hub having a hollow cylindrical portion, and a radially outwardly extending flange portion located substantially centrally of the cylindrical portion, the cylindrical portion of the hub being sleeved over the end of the axle and the bearings and having a radially inwardly extending central portion for maintaining the bearings in axially spaced apart relation along the axle, a washer and nut threaded over the threaded end of the axle in contact with the inner race of the axially outer bearing urging the outer race of the axially outer bearing into contact with the radially inwardly extending portion of the cylindrical portion of the hub, urging the radially outer race of the axially inner bearing into engagement with the radially inwardly extending portion of the cylindrical portion of the hub and the radially inner race of the axially inner bearing into engagement with the abutment formed by the reduced diameter of the end portion of the axle whereby the hub is secured axially of the axle for relative rotation with respect thereto, a radially enlarged inner diameter at one end of the hub, a grease cap secured in the radially enlarged portion of the one end of the hub, a check valve threaded through the grease cap on the axis of rotation of the hub about the axle for permitting air under pressure trapped in the sealed bearing structure to escape and preventing water from entering the sealed bearing structure, including a cylindrical valve body which tapers inwardly toward one end and is threaded exteriorly at one end into the grease cap, an axial passage extending through the body tapered inwardly toward the one end, a valve seat adjacent the one end of the body member within the passage, a ball valve positioned in the tapered passage in the body, spring means positioned in the tapered passage urging the ball valve onto the valve seat, a valve plate secured over the other end of the tapered passage through the body against which the spring means reacts and radially extending passages in the valve body communicating with the tapered passage therein adjacent the other end of the body, a radially enlarged inner diameter at the other end of the hub and a grease seal positioned in the other end of the hub between the other end of the hub and the micro-finished surface of the axle including an annular cage having an inwardly opening, generally U-shaped cross section including inner and outer radially extending walls, an annular sealing member having radially and axially extending portions positioned against the outer radially extending wall of the cage and against the micro-finished surface of the axle, respectively, and an annular resilient member on the inner radially extending wall and biasing the radially extending portion of the sealing member against the outer radially extending wall of the cage and positioned radially outwardly of the axially extending portion of the sealing member and having a diameter before assembly slightly less than the combined diameter of the micro-finished surface of the axle and the axially extending portion of the sealing member for urging the axially extending portion of the sealing member into sealing engagement with the micro-finished surface of the axle, said sealing member being provided with concave surfaces in engagement with the outer radially extending wall of the cage and the micro-finished surface of the axle, whereby a pair of sealing areas is provided between the sealing member and the outer radially extending wall of the cage and between the sealing member and the micro-finished surface of the axle.

References Cited

UNITED STATES PATENTS

| | | | |
|---|---|---|---|
| 1,153,401 | 9/1915 | Milne | 137—539 X |
| 1,305,964 | 6/1919 | Dickson | 137—539 X |
| 2,413,671 | 12/1946 | Wolf et al. | 277—152 X |
| 2,876,718 | 3/1959 | Vaughan | 308—187 X |
| 2,895,504 | 7/1959 | Lederer | 137—539 |
| 3,000,675 | 9/1961 | Larkin | 308—187.1 |
| 3,010,748 | 10/1961 | Haynie | 277—153 |
| 3,021,161 | 2/1962 | Rhoads et al. | 277—153 X |
| 3,089,738 | 5/1963 | Steiner | 308—187 |
| 3,169,809 | 2/1965 | Pendleton | 308—187.1 |
| 3,177,041 | 4/1965 | Isenbarger | 308—187.1 |
| 3,306,683 | 2/1967 | Deuring | 277—183 X |

CARROLL B. DORITY, Jr., Primary Examiner

U.S. Cl. X.R.

277—153; 308—016, 187